(12) United States Patent
Kamura

(10) Patent No.: US 7,174,108 B2
(45) Date of Patent: Feb. 6, 2007

(54) TRANSMISSION DEVICE AND REPEATER

(75) Inventor: Yuji Kamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 531 days.

(21) Appl. No.: 10/099,965

(22) Filed: Mar. 19, 2002

(65) Prior Publication Data
US 2003/0081295 A1   May 1, 2003

(30) Foreign Application Priority Data
Oct. 31, 2001   (JP)  ............................. 2001-333803

(51) Int. Cl.
*H04B 10/02* (2006.01)

(52) U.S. Cl. ...................... 398/181; 398/173; 398/175; 398/177; 398/13; 398/15; 398/20; 398/21; 398/32; 398/33; 398/37; 398/38; 359/341; 359/337

(58) Field of Classification Search ................. 398/6, 398/62, 64, 9, 15, 33, 173, 175, 177, 181, 398/13, 20, 21, 32, 37, 38; 359/341, 337
See application file for complete search history.

(56) References Cited

U.S. PATENT DOCUMENTS

| | | | | |
|---|---|---|---|---|
| 5,535,037 | A  * | 7/1996 | Yoneyama | 398/181 |
| 6,359,708 | B1 * | 3/2002 | Goel et al. | 398/15 |
| 6,423,963 | B1 * | 7/2002 | Wu | 250/227.14 |
| 6,512,628 | B1   | 1/2003 | Terahara et al. | |
| 6,681,079 | B1 * | 1/2004 | Maroney | 398/15 |
| 2003/0123139 | A1 | 7/2003 | Terahara et al. | |

FOREIGN PATENT DOCUMENTS

EP    1133030    9/2001

OTHER PUBLICATIONS

Japanese Abstract No. 05284110, dated Oct. 29, 1993.
Japanese Abstract No. 09046297, dated Feb. 14, 1997.
Japanese Abstract No. 2001-07768, dated Jan. 12, 2001.
Japanese Abstract No. 2001-077731, dated Mar. 23, 2001.
Japanese Office Action issued Nov. 22, 2005 in corresponding Japanese Patent Application No. 2001-333803.
Patent Abstracts of Japan, Publication No. 03-214936 Published Sep. 20, 1991.
Patent Abstracts of Japan, Publication No. 03-239028 Published Oct. 24, 1991.
Patent Abstracts of Japan, Publication No. 05-284110 Published Oct. 29, 1993.
Patent Abstracts of Japan, Publication No. 2001-251006 Published Sep. 14, 2001.
Patent Abstracts of Japan, Publication No. 2003-114453 Published Apr. 18, 2003.

\* cited by examiner

*Primary Examiner*—Hanh Phan
(74) *Attorney, Agent, or Firm*—Staas & Halsey LLP

(57) ABSTRACT

A transmission system is provided that recognizes occurrence of a fault efficiently so that the workability and quality of service can be improved. An optical amplifier part amplifies an optical main signal. A fault occurrence recognizing part detects a pump light used for an opposing device via an optical fiber transmission line to which an optical main signal is sent by the repeater. If the pump light is not detected, the fault occurrence recognizing part recognizes occurrence of a fault. A light cutoff control part stops the optical amplifying part outputting an amplified signal so that the light cutoff control in only one of two directions is performed when a fault occurs.

2 Claims, 16 Drawing Sheets

TRANSMISSION DEVICE AND REPEATER

BACKGROUND OF THE INVENTION (1) Field of the Invention

The present invention relates to transmission devices and repeaters, and more particularly, to an optical transmission device and an optical repeater.

(2) Description of the Related Art

An increase in the transmission capacity because of recent remarkable development of the Internet has stimulated quick spreading of the optical communications network technique WDM (Wavelength Division Multiplex). WDM multiplies lights of different wavelengths and simultaneously transmits a plurality of multiplied signals over a single optical fiber.

In WDM systems, long-distance transmission has been realized in such a way that the optical signal is not converted into an electric signal at each repeater station due to the cost but is amplified by an optical amplifier.

The amplified signal from the optical amplifier is at a high level. If a fault occurs in the optical fiber transmission line or the optical transmission device, the optical signal may be emitted in the air. This situation is dangerous. For example, the dangerous situation will occur when the optical fiber cable is disconnected or pulled off from a unit. In order to prevent a maintenance person from being injured by the fault, the optical output is automatically stopped when a fault occurs.

FIG. 15 is a block diagram of an outline of a repeater station provided in a conventional WDM system. A WDM system 200 has repeater stations 210 and 220, which are coupled through optical fiber transmission lines L1 and L2. The repeater station 210 includes optical amplifiers 212a and 212b, optical couplers C1a and C1b, and a supervisory part 211. Similarly, the repeater station 220 includes optical amplifiers 222a, 222b, optical couplers C2a and C2b The WDM system handles not only optical main signals for services but also an optical control signal called OSC (Optical Supervisory Channel). The OSC signal includes information (DCC: Data Communication Channel) indicating the monitored states of the repeater stations and optical amplifiers and the settings of work. The optical control signal is wavelength-multiplexed into the optical main signal.

The optical main signal is amplified by the optical amplifier, while the OSC signal bypasses the optical amplifier in order to avoid interference with the optical main signal because the OSC signal is a control signal. In addition, the OSC signal is set at a comparatively low level.

The WDM system 200 operates as follows. In the up direction, the optical coupler C1a in the repeater station 210 combines the optical main signal amplified by the optical amplifier 212a and the OSC signal from the supervisory signal 211, and thus produces a multiplexed light signal. Then, the multiplexed light signal travels over the optical fiber transmission line L1 and is sent to the repeater station 220.

In the repeater station 220, the optical coupler C2a separates the optically multiplexed signal into the optical main signal and the OSC signal. The optical main signal is supplied to the optical amplifier 222a, and the OSC signal is supplied to the supervisory unit 221. In the down direction, an operation similar to that in the up direction is performed.

FIG. 16 shows a conventional light cutoff control, which is performed when a line fault occurs in the WDM system 200.

In step S100, a fault occurs in the optical fiber transmission line L1, which is disconnected.

In step S101, the supervisory part 221 of the repeater station 220 detects loss of the optical signal from the optical fiber transmission line L1 (inputting of the optical main signal and the OSC signal stops), and recognizes that a fault has occurred in the optical fiber transmission line L1.

In step S102, the supervisory part 221 stops the optical amplifier 222b amplifying the signal.

In step S103, the supervisory part 221 has fault information included in the OSC signal, and sends it to the repeater station 210 via the optical fiber transmission line L2.

In step S104, the supervisory part 211 of the repeater station 210 receives the OSC signal, and stops the optical amplifier 212a amplifying the signal.

As described above, once a fault occurs in one of the two optical fiber transmission lines, the other optical fiber transmission line that is normal is subjected to the light cutoff control (step S102).

The above control is employed taking into the account the following. In case where the optical fiber transmission line L1 is disconnected and only the optical amplifier 212a is stopped from amplifying the signal (in other words, step S102 is not performed), means for stopping the optical amplifier 222b is no longer available if the other optical fiber L2 is disconnected before the optical fiber transmission line L1 is restored.

In order to avoid such a situation, both the up and down optical fiber transmission lines are subjected to the light cutoff control even if only one of them becomes faulty. In the above-mentioned example, the OSC signal travels over the optical fiber transmission line L2. However, the OSC signal is at a comparatively low level and no dangerous situation may occur even if the optical fiber transmission line L2 is broken.

It could not be said that the system operates efficiently because the light cutoff control prevents the main signals from propagating through the normal transmission line as well as the faulty transmission line.

When the recent style of unitization of the Internet is considered, the data capacity in the down direction from the server to the user is much more than that in the up direction from the user to an ISP (Internet Service Provider), as viewed from ADSL (Asymmetric Digital Subscriber Line).

That is, the practical bidirectional transmission network has different traffics in the up and down directions. Breaking the channels having high traffic in response to disconnection of the channels having low traffic would degrade work efficiency and service quality.

As for the example of FIG. 16, it is desired to provide means for stopping the optical amplifier 222b amplifying the signal even if the optical fiber transmission line L2 is disconnected before the optical transmission line L1 is restored after it becomes faulty and the optical amplifier 212a is stopped from amplifying the signal. This would be achieved by enabling the light cutoff control with the one-way optical fiber transmission line rather than the two-way optical fiber transmission line.

SUMMARY OF THE INVENTION

Taking into consideration the above, an object of the present invention is to provide a transmission system capable of performing optical transmission control directed to improving workability and service quality when a fault occurs.

It is another object of the present invention to provide a repeater capable of performing optical transmission control directed to improving workability and service quality when a fault occurs.

The above objects of the present invention are achieved by a transmission system performing optical transmission including: a repeater on a sending side including an optical amplifier amplifying an optical main signal, and a fault occurrence recognizing part detecting a pump light used for an opposing device via an optical fiber transmission line to which an optical main signal is sent by the repeater; and another repeater on a receiving side sending the pump light.

The above objects of the present invention are also achieved by a repeater performing an optical relay transmission including: an optical amplifier amplifying an optical main signal by using a pump light; and a fault occurrence recognizing part that receives the pump light used in an opposing device via an optical fiber transmission line to which an optical main signal is sent by the repeater and recognizes occurrence of a fault, if the fault occurrence recognizing part fails to receive the pump light.

The above and other objects, features and advantages of the present invention will become apparent from the following detailed description when taken in conjunction with the accompanying drawings which illustrate preferred embodiments of the present invention by way of example.

DESCRIPTION OF THE PREFERRED EMBODIMENTS

A description will now be given of embodiments of the present invention with reference to the accompanying drawings.

Figure 1:
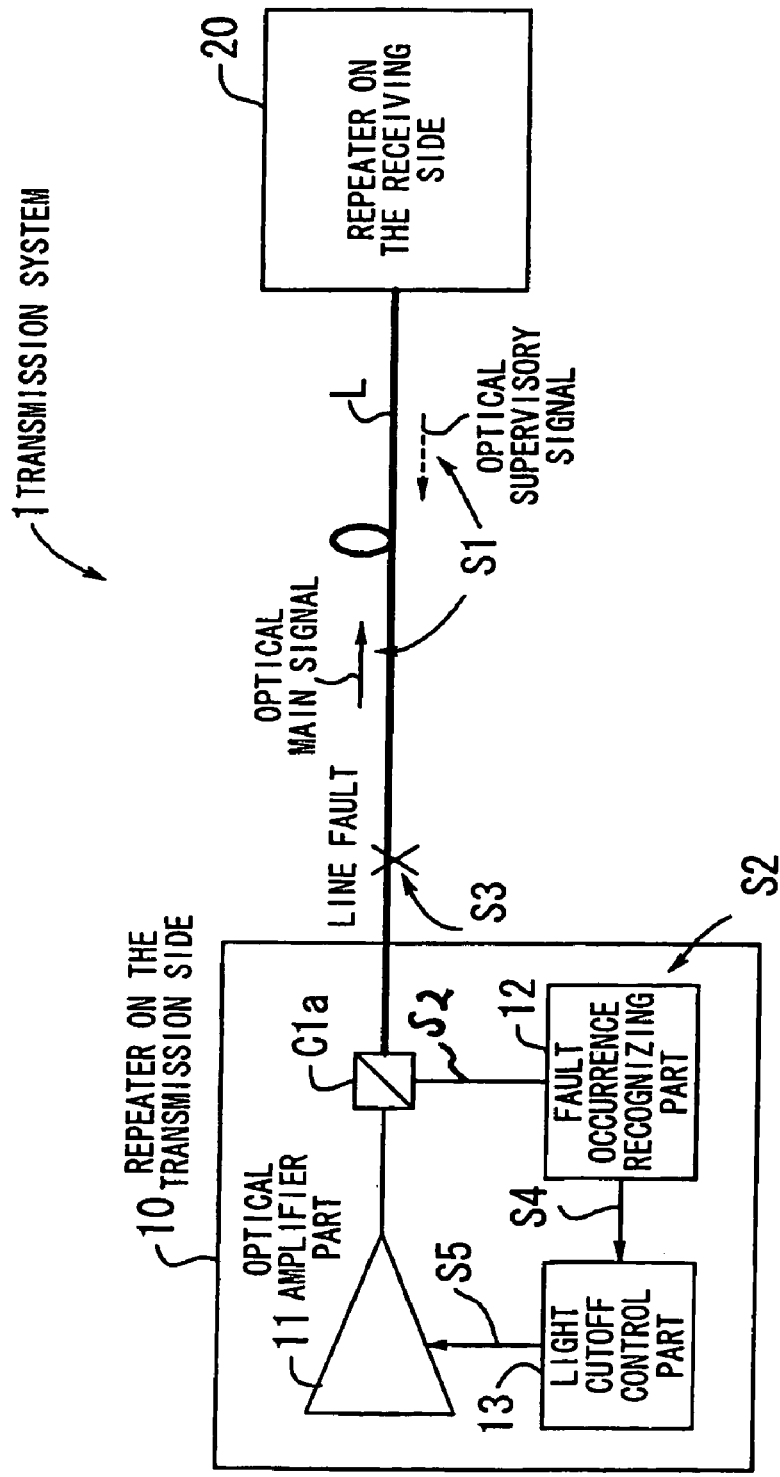
FIG. 1 is a diagram illustrating the principles of a transmission system of the present invention.

FIG. 1 is a diagram of the principles of a transmission system of the invention. A transmission system 1 shown in this figure includes a repeater 10 on the sending side and a repeater 20 on the receiving side, and performs optical transmission (repeat) control. In practice, the functions of the repeaters 10 and 20 realized by the present invention are included in the same repeater.

The following description is mainly directed to an application of the transmission system 1 of the present invention to the WDM system. In transmission of the optical main signal in the present WDM system, for example, 88 main signal wavelengths of the C band and 88 main signal wavelengths of the L band are multiplexed, so that 176 wavelengths are transmitted in multiplexed formation in total.

The optical amplifier 11 of the repeater on the sending side amplifies the main signal. A fault occurrence recognizing part 12 performs a control of detecting a pump light used in the other device (repeater 20 on the receiving side) via an optical fiber transmission line L to which the optical main signal is sent from its own device (repeater 10 on the sending side), and recognizes occurrence of a fault if the pump light is detected. A light cutoff control part 13 stops the optical amplifier 11 outputting the optical signal when a fault occurs, so that a one-way light cutoff control can be performed.

The repeater 20 on the receiving side that receives the optical main signal sends the pump light to the repeater 10 on the sending side via the optical fiber transmission line L in the opposite direction to that in which the optical main signal is transferred.

Next, an operation is now be described.

In step S1, the main signal is sent to the repeater 20 on the receiving side from the repeater 10 on the sending side over the optical fiber transmission line L, and the pump light is transmitted over the transmission line L in the opposite direction.

In step S2, the pump light is separated through the optical coupler C1a, and is received by the fault occurrence recognizing part 12. If is determined that the receiving level is normal, the work state in step S1 continues.

In step S3, the optical fiber transmission line L is disconnected (cut or broken).

In step S4, the fault occurrence recognizing part 12 detects a receiving level of the pump light lower than the threshold level, and recognizes occurrence of a fault. Then, the part 12 notifies the light cutoff control part 13 of information about fault occurrence.

In step S5, the light cutoff control part 13 stops the optical amplifier 11 amplifying the signal on the basis of the information about fault occurrence.

Figure 2:
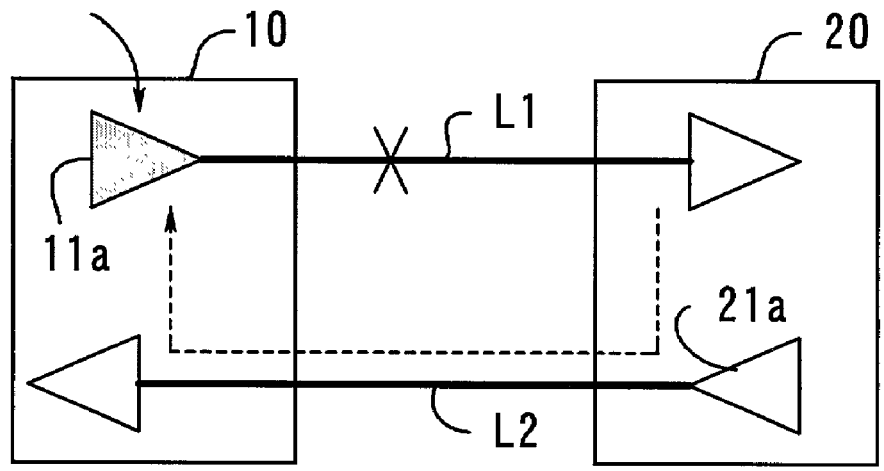
FIG. 2 is a diagram of a concept of a conventional light cutoff control.
Figure 2:
Figure 2:
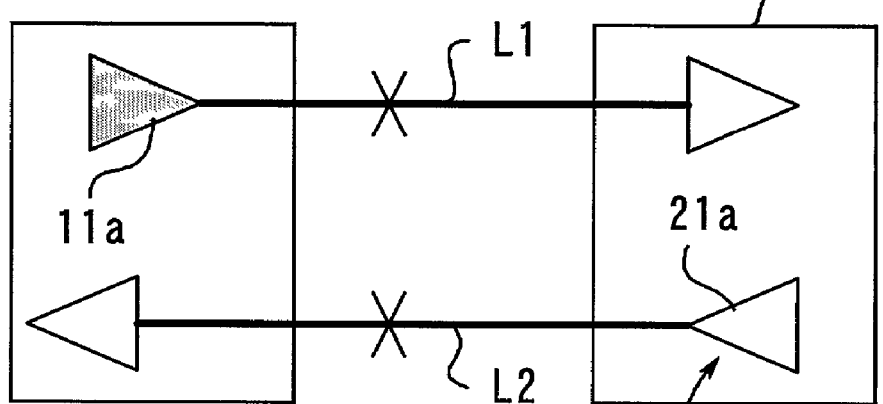
Figure 3:
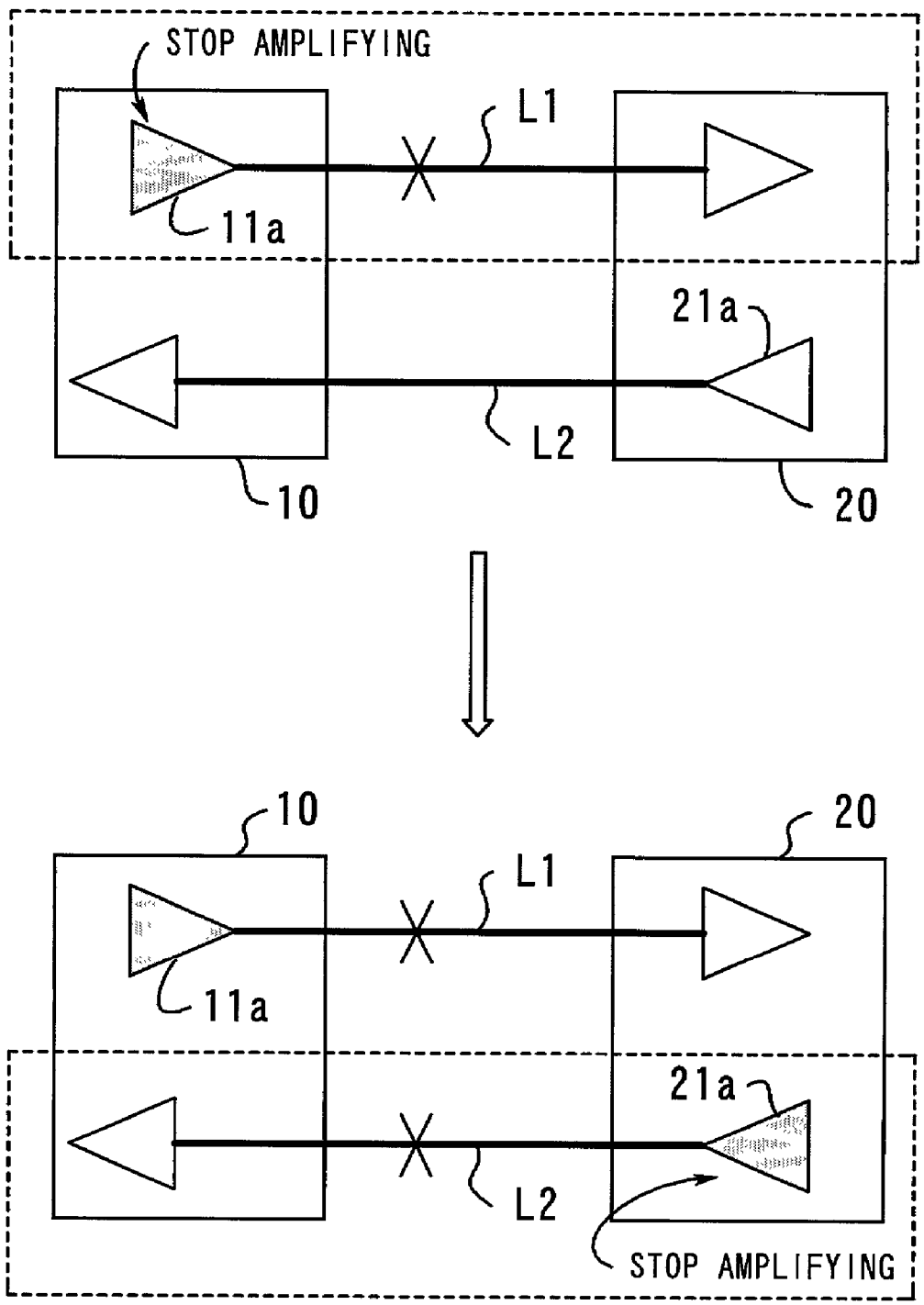
FIG. 3 is a diagram of a concept of a light cutoff control of the present invention.

FIGS. 2 and 3 show an outline of the difference in light cutoff control between the prior art and the present invention. FIG. 2 shows a prior art, and FIG. 3 shows the light cutoff control of the present invention. Conventionally, if the optical fiber transmission line L1 that connects the repeaters 10 and 20 in the up direction is disconnected, a fault notice is sent to the repeater 10 via the optical fiber transmission line L2 as indicated by the broken line.

If the optical fiber transmission line L2 is also broken before the optical fiber transmission line L1 is restored, it is no longer possible to stop an optical amplifier 21a of the repeater 20 outputting the amplified signal. Thus, it is necessary to stop the optical amplifier 21a connected to the optical fiber transmission line L2 in which no fault occurs and to then send the fault notice to the repeater 10, whereby the optical amplifier 11a on the sending side can be stopped.

In contrast, according to the present invention, if the optical fiber transmission line L1 is disconnected, this can be detected at the repeater 10 without using the optical fiber transmission line L2, whereby the optical amplifier 11a can be stopped from outputting the amplified signal. The light cutoff control is performed within the section indicated by the dotted line.

That is, for each optical fiber transmission line in which a fault occurs, one-way light cutoff control can be carried out. Therefore, even if the optical fiber transmission line L1 is disconnected, the optical fiber transmission line L2 can be continuously utilized. Even if the optical fiber transmission line L2 is broken before the optical fiber transmission line L1 is restored, it is possible to stop the optical amplifier 21a in the repeater 20 stopping the amplified signal.

Figure 4:
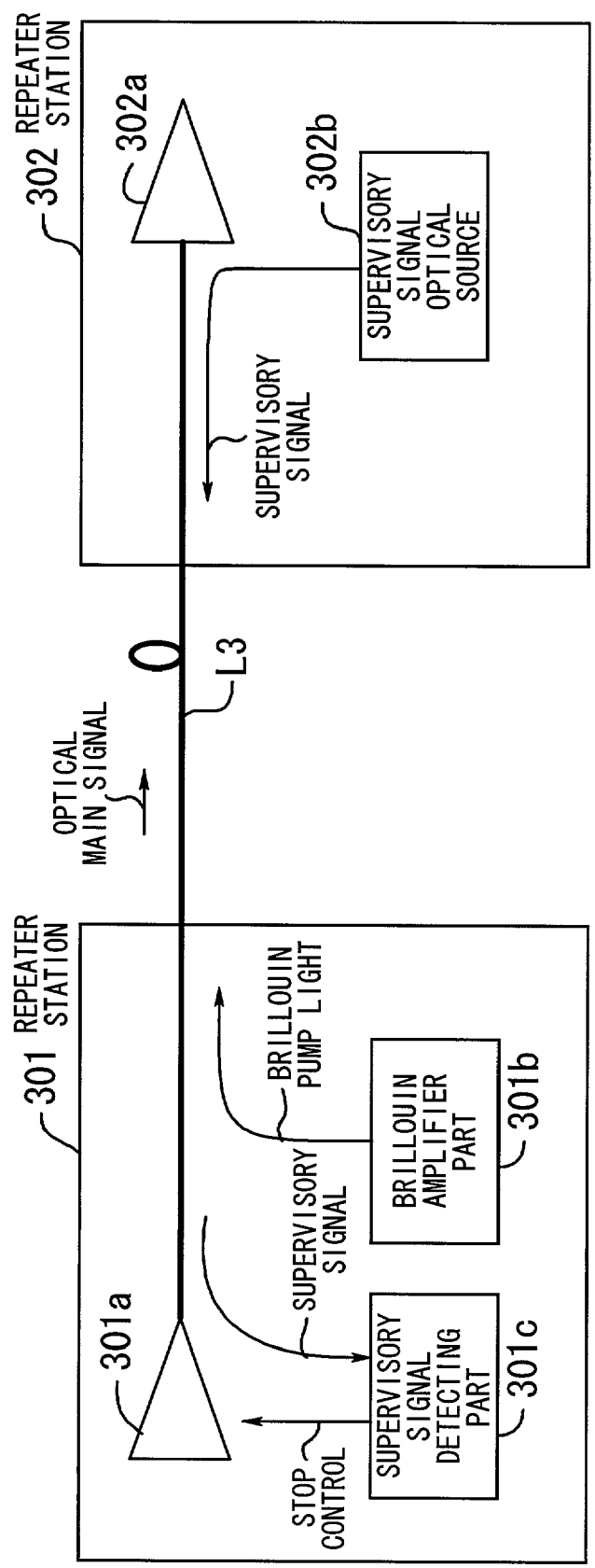
FIG. 4 is a block diagram of a conventional structure.

Next, a description will now be given of the distinctions between the present invention and the prior art disclosed in Japanese Unexamined Patent Publication No. 05-284110. For the light cutoff control, the present invention detects the pump light that is sent to the opposite direction to that in which the main signal is sent over the same optical fiber transmission line FIG. 4 is a diagram of a prior art structure of Japanese Unexamined Patent Application No. 05-284110. Repeater stations 301 and 302 are connected via an optical fiber transmission line L3. The repeater station 301 includes an optical amplifier 301a, a Brillouin amplifier part 301b, and a supervisory signal detecting part 301c. The repeater station 302 includes an optical amplifier 302a and a supervisory signal light source 302b (an optical coupler is omitted).

The optical main signal amplified by the optical amplifier 301a is sent over the optical fiber transmission line L3 in the up direction. A supervisory signal sent from the supervisory signal light source 302b propagates along the optical fiber transmission line L3 in the opposite direction. The brillouin amplifier 301b emits a Brillouin pump light into the optical fiber transmission line L3 in the opposite direction to that of the supervisory signal, so that the supervisory signal can be amplified.

The supervisory signal detecting part 301c performs control of detecting the supervisory signal. If the supervisory signal is not detected, the part 301c deems the optical fiber transmission line L3 to be disconnected, and stops the optical amplifier 301a outputting the amplified signal.

The Brillouin amplification amplifies light using stimulated Brillouin scattering utilizing acoustic phonons. As compared to Raman scattering using optical phonons (which has widely been used for optical amplification in recent WDM systems, the Brillouin effect has a narrow transmission band (~10 MHz (0.08 mp), whereas Raman scattering has a transmission band of ~30 THz (240 nm). In the above viewpoints, the Brillouin amplification may be used for limited applications and may not be flexibly applied to wideband communication systems such as WDM.

Conventionally, a separate light source for the supervisory signal is provided to carry out the light cutoff control. Further, a Brillouin amplifying part is provided specifically for amplifying the supervisory signal. This conventional system requires functions that must be added to many optical systems, and may cause some difficulty in rearrangement of the system configuration and downsizing.

The present invention is not directed to mere addition of new functional parts but utilizes the existing optical network systems (particularly WDM systems) in order to achieve efficient and effective fault recognition control and light cutoff control with minimum expansion.

Figure 5:
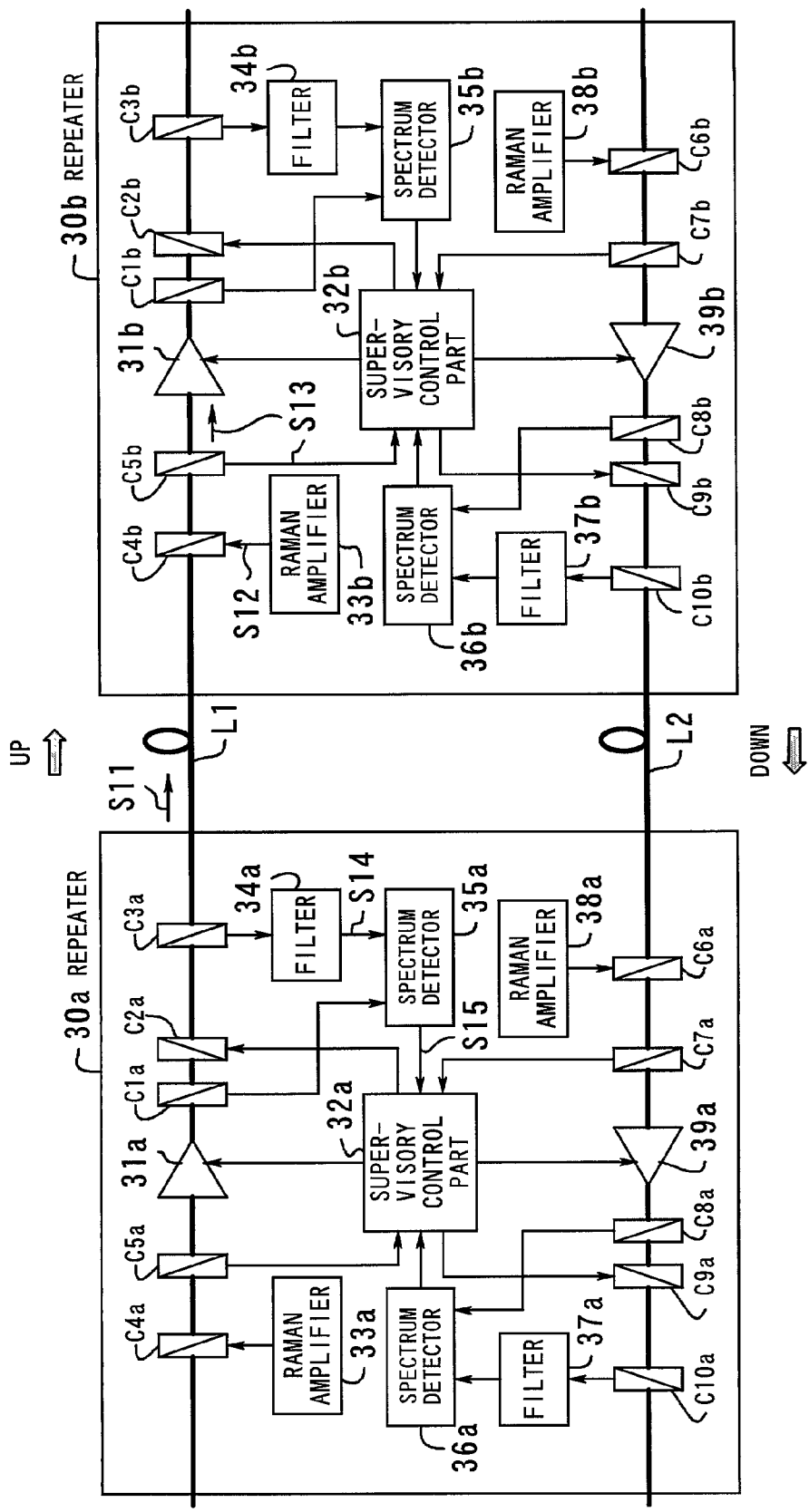
FIG. 5 is a block diagram of a structure of a transmission system.

The structure and operation of an embodiment of the present invention will now be described in detail. FIG. 5 shows the structure of a transmission system. Repeaters 30a and 30b (referred to as repeaters 30 generally) are connected by optical fiber transmission lines L1 and L2. The repeaters 30 include an optical amplifier, a supervisory control part, a spectrum detector, an optical fiber (hereinafter simply referred to as filter), a Raman amplifier, and an optical coupler (hereinafter simply referred to as coupler).

The repeater 30a includes a supervisory control part 32a, and has, as to the up transmission line L1, a coupler C4a, a coupler C5a, an optical amplifier 31a, couplers C1a, C2a and C3a, a Raman amplifier 33a, a filter 34a, and a spectrum detector 35a.

As to the down transmission line L2, the repeater 30a includes a coupler C6a, a coupler C7a, an optical amplifier 39a, couplers C8a, C9a and C10a, a Raman amplifier 38a, a filter 37a and a spectrum detector 36a.

Similarly, the repeater 30b includes a supervisory control part 32b, and has, as to the up transmission line L1, a coupler C4b, a coupler C5b, an optical amplifier 31b, couplers C1b, C2b and C3b, a Raman amplifier 33b, a filter 34b, and a spectrum detector 35b.

As to the down transmission line L2, the repeater 30b includes a coupler C6b, a coupler C7b, an optical amplifier 39b, couplers C8b, C9b and C10b, a Raman amplifier 38b, a filter 37b, and a spectrum detector 36b.

A normal operation is described below, in which only the operation involved in the up transmission line L1 is described because the operation involved in the down line L2 is the same as that in the up direction.

In step S11, a main signal after passing through the couplers C4a and C5a and being amplified by the optical amplifier 31a and passing through the coupler C1a are is combined, by the coupler C2a, with an OSC signal which is a light control signal from the supervisory control part 32a. The above combining results in a multiplexed light signal, which passes through the coupler C3a and is sent to the repeater 30b via the transmission line L1.

In step S12, the multiplexed light signal is optically amplified so that the optical fiber transmission line L1 acts as an amplifying medium that uses a backward Raman scattering light applied to the optical fiber from the Raman amplifier 33b via the coupler C4b. The wavelength of the Raman pump light is set approximately equal to 1480 nm in order to utilize the Raman effect with respect to the C band in the range 1530–1560 nm and the L band in the range 1575–1620 nm.

In step S13, the multiplexed light signal passes through the coupler C4b, and is separated into the optical main signal and the OSC signal by the coupler C5b. The optical main signal is applied to the optical amplifier 31b, and the OSC signal is applied to the supervisory control part 32b. The optical main signal amplified by the optical amplifier 31b passes through the coupler C1b, and is combined into the OSC signal by the coupler C2b. The multiplexed light signal thus produced passes through the coupler C3b.

In step S14, Raman pump light is picked up by the coupler C3a, and is filtered by the filter 34a. Then, the filtered Raman pump light is output to the spectrum detector 35a. Since the Raman pump light is at an extremely high level, the remaining component of the pump light may reach the repeater 30a. The filter 34a cuts off lights having wavelengths of 1500 nm or higher in order to prevent the main signal from being returned due to reflection at a connector end surface (return light).

In step S15, the spectrum detector 35a detects the spectrum of the pump light received from the filter 34a, and sends the detection result to the supervisory control part 32a. Then, the supervisory control part 32a recognizes the spectrum detected as the normal operating spectrum. The spectrum detector 35a detects the spectrum of the output signal from the optical amplifier 31a split by the coupler C1a (the detection target is periodically switched), and supplies the detection result to the supervisory control part 32a (that is, the supervisory control part 32a monitors the output from the optical amplifier 31a also).

Figure 6:
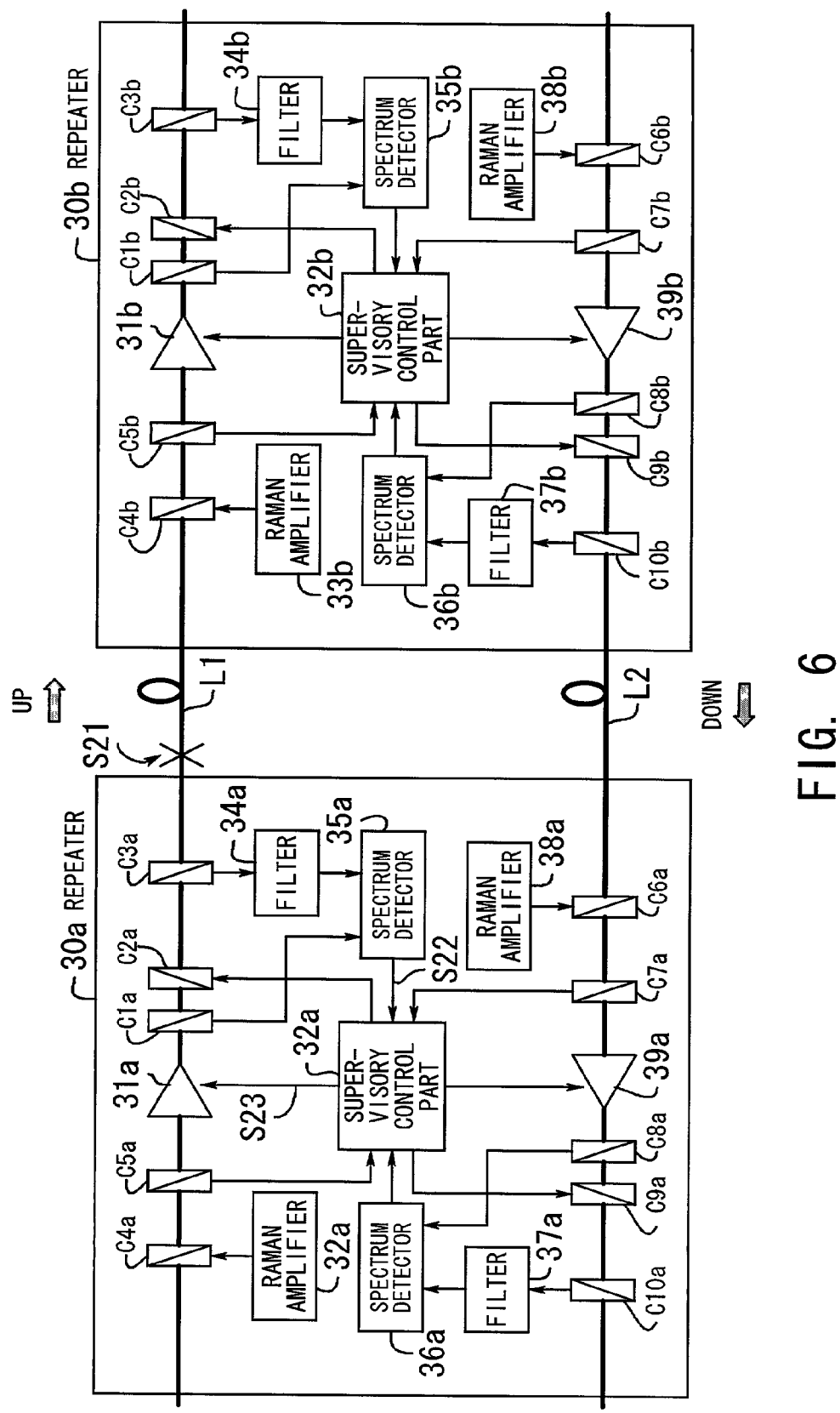
FIG. 6 is a diagram of an operation of the light cutoff control that is performed when an optical fiber transmission line is broken.

Next, a description will be given of the light cutoff control that is performed when a fault occurs. FIG. 6 shows an operation of the light cutoff control performed when the optical fiber transmission line L1 is disconnected.

In step S21, a fault occurs in the optical fiber transmission line L1 so that it is disconnected.

In step S22, the Raman pump light does not reach the repeater 30a. Thus, the spectrum detector 35a does not detect the spectrum of the Raman pump light, and sends the detection result to the supervisory control part 32a.

In step S23, the supervisory control part 32a determines, from the result information from the spectrum detector 35a, that the optical fiber transmission line L1 has been disconnected, and stops the optical amplifier 31a outputting the signal.

Figure 7:
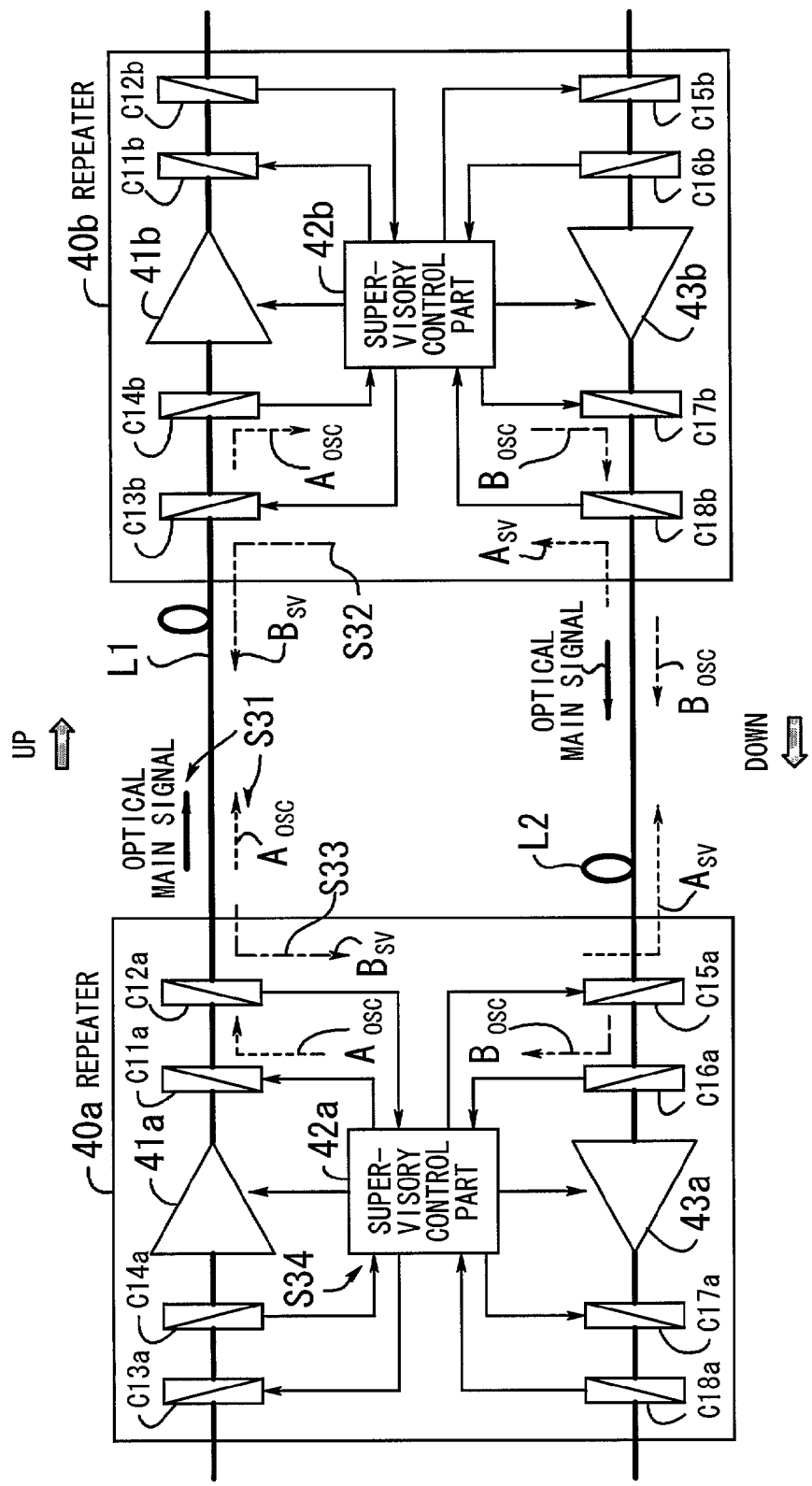
FIG. 7 is a diagram of a transmission system.

Another embodiment is described below. FIG. 7 shows a configuration of the transmission system. Repeaters 40a and 40b (referred to as repeaters 40 generally) are connected by the optical fiber transmission lines L1 and L2. The repeaters 40 include an optical amplifier, a supervisory control part and a coupler.

The repeater 40a includes a supervisory control part 42a, and further includes a coupler C13a, a coupler C14a, an optical amplifier 41a, and couplers C11a and C12a regarding the up transmission line L1.

Regarding the down transmission line L2, the repeater 40a includes a coupler C15a, a coupler C16a, an optical amplifier 43a, and couplers C17a and C18a.

Similarly, the repeater 40b includes a supervisory control part 42b, and has, as to the up transmission line L1, a coupler C13b, a coupler C14b, an optical amplifier 41b, and couplers C11b and C12b.

As to the down transmission line L2, the repeater 40b includes a coupler C15b, a coupler C16b, an optical amplifier 43b, and couplers C17b and C18b.

The repeater 40a outputs, to the optical fiber transmission line L1, a multiplexed light signal in which the optical main signal and an OSC signal Aosc (its wavelength is denoted as $\lambda 1$) are multiplexed. The repeater 40b outputs, to the transmission line L2, an optical supervisory signal Asv of the same wavelength $\lambda 1$ as the OSC signal Aosc in the opposite direction to that in which the multiplexed light signal sent by the repeater 40b propagates.

The repeater 40b outputs, to the optical fiber transmission line L2, a multiplexed light signal in which the optical main signal and an OSC signal Bosc (its wavelength is denoted as $\lambda 2$) are multiplexed. The repeater 40b also outputs, to the transmission line L1, an optical supervisory signal Bsv of the same wavelength $\lambda 2$ as the OSC signal Bosc in the opposite direction to the multiplexed light signal sent by the repeater 40a. The optical supervisory signal has the same level as that of the OSC signal. The wavelengths $\lambda 1$ and $\lambda 2$ are selected within the range in which the optical main signals are not affected.

A normal operation is described in which only the operation involved in the up transmission line L1 is described because the operation involved in the down line L2 is the same as that in the up direction.

In step S31, a main signal after passing through the couplers C13a and C14a and being amplified by the optical amplifier 41a is combined, by the coupler C11a, with the OSC signal Aosc which is a light control signal from the supervisory control part 42a. The above combining results in a multiplexed light signal, which passes through the coupler C12a and is sent to the repeater 40b via the transmission line L1.

In step S32, the supervisory control part 42b outputs the optical supervisory signal Bsv ($\lambda 2$). This signal Bsv is combined with the main signal by the coupler C13b, and is sent to the repeater 40a via the optical fiber transmission line L1. The multiplexed light signal is separated, by the coupler C14b, into the main signal and the supervisory signal, which are then sent to the optical amplifier 41b and the supervisory control part 42b.

In step S33, the optical supervisory signal Bsv ($\lambda 2$) is separated by the coupler C12a and is input to the supervisory control part 42a.

In step S34, the supervisory control part 42a detects the supervisory signal Bsv ($\lambda 2$), and recognizes the normal receipt.

Figure 8:
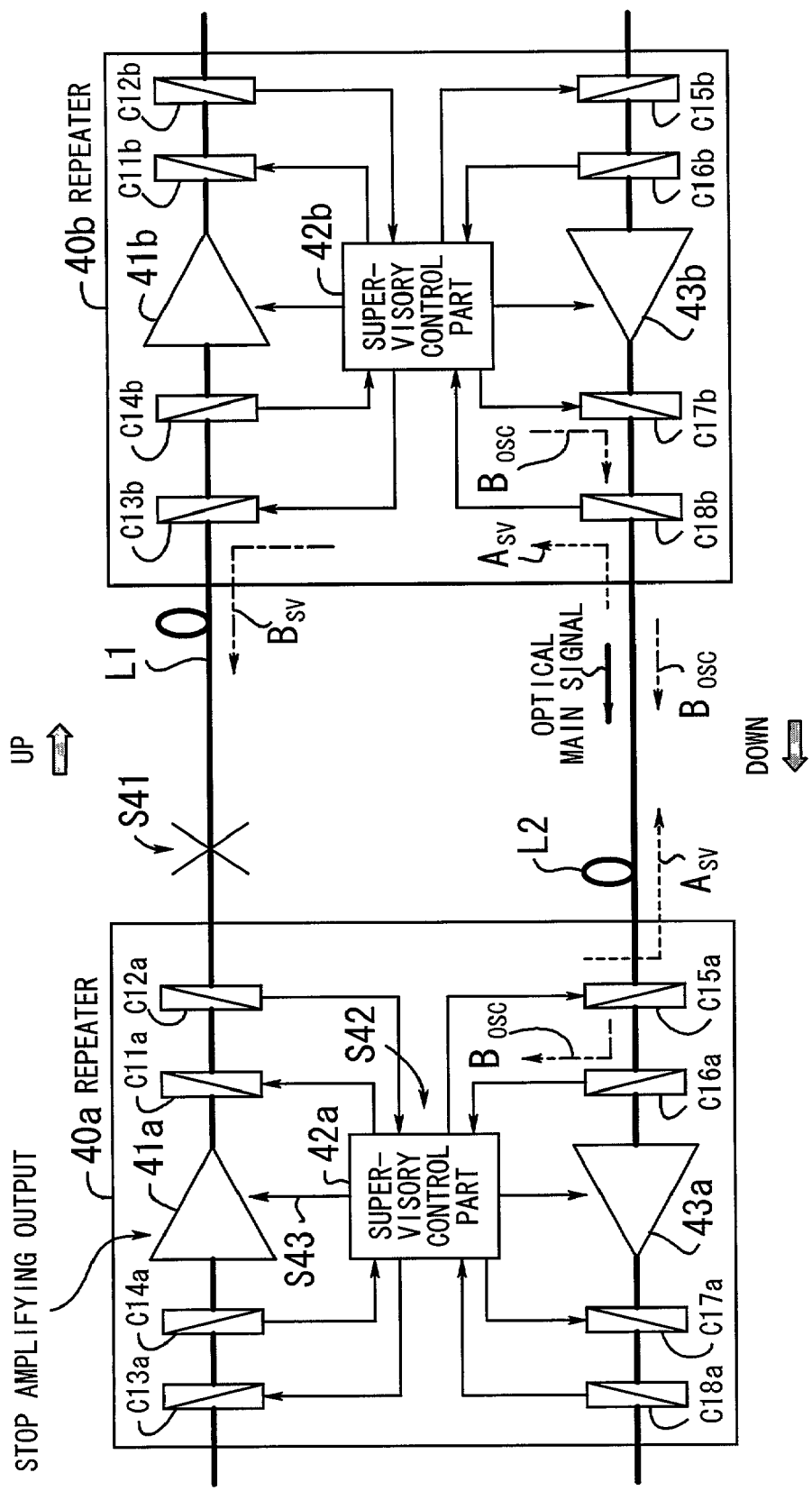
FIG. 8 is a diagram of an operation of the light cutoff control when an optical fiber transmission line is broken.

Next, a description will be given of an operation of the light cutoff control that is performed when a fault occurs. FIG. 8 shows an operation of the light cutoff control performed when an optical fiber transmission line L1 is disconnected.

In step S41, the optical fiber transmission line L1 is disconnected.

In step S42, since the optical supervisory signal Bsv ($\lambda 2$) does not reach the repeater 40a, the supervisory control part 42a fails to detect it and determines that the optical fiber transmission line L1 has been disconnected.

In step S43, the supervisory control part 42a stops the optical amplifier 41a outputting the signal.

The supervisory control part produces the OSC signal by modulating a light signal of a wavelength $\lambda n$ emitted from a source. Further, the optical supervisory signal Asv and the optical supervisory signal Bsv have the same wavelengths as those of the OSC signals sent by the respective repeaters, and have no mapped information.

Thus, a splitter is provided between the light source and the modulation control part so that the light signal of the wavelength ($\lambda n$) is separated into a part which can be used as optical supervisory signal ($\lambda n$). In that manner, the present invention can be put in practice by slight circuit modification. The optical supervisory signal is produced by utilizing the original OSC signal. Further, the transmission level of the supervisory signal is the same as that of the OSC signal. Therefore, there is no need to provide a particular amplifying function of amplifying only the supervisory signal in the prior art.

Also, in the above case, the optical supervisory signal ($\lambda n$) is always output. Alternatively, the light cutoff control can be implemented by generating a light pulse of the wavelength $\lambda n$ (a pilot tone signal) and periodically sending the pulse in the opposite direction to the flow of the optical main signal.

Figure 9:
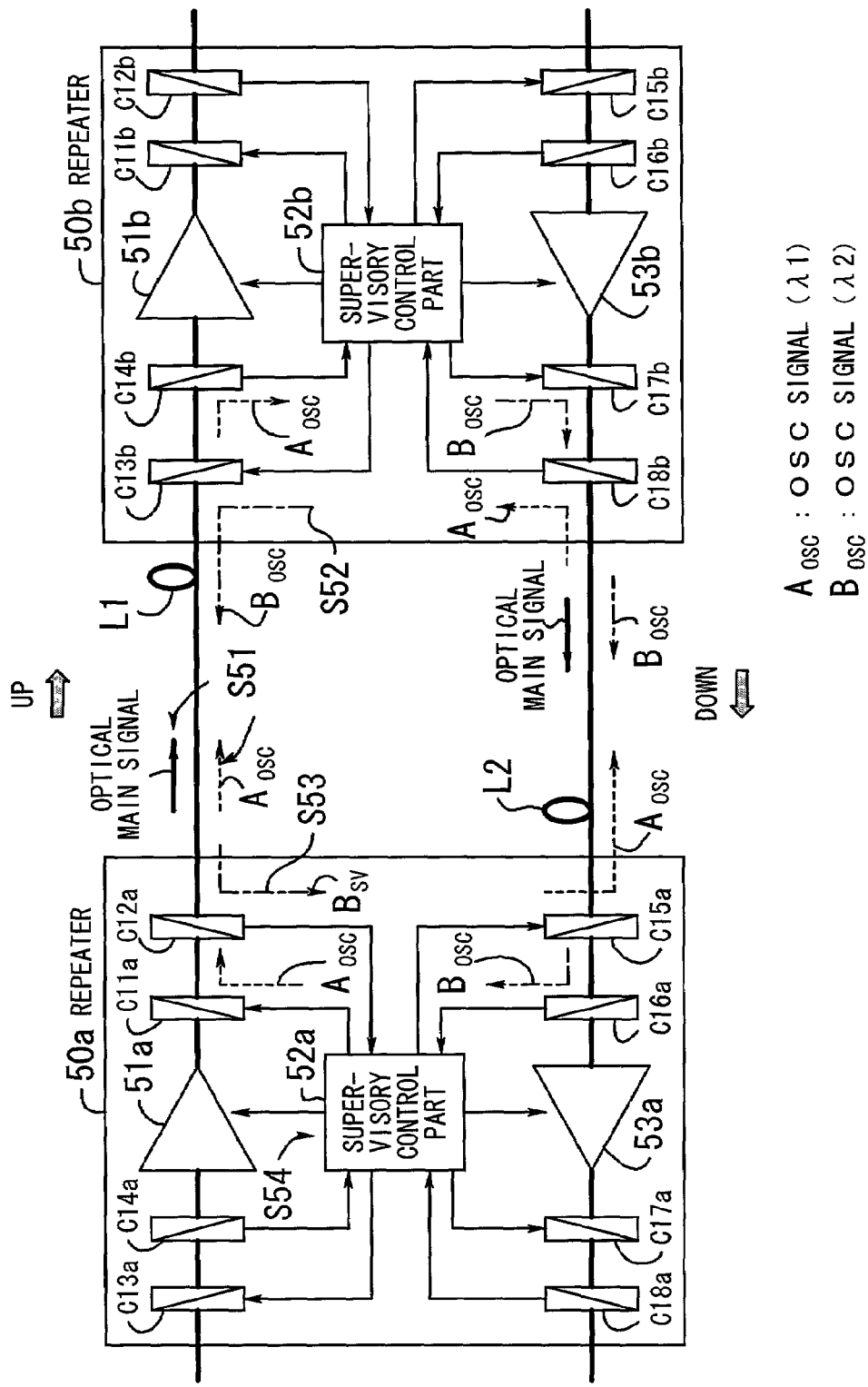
FIG. 9 is a diagram of a structure of a transmission system.

Yet another embodiment of the present invention is now described. FIG. 9 shows an associated configuration of the transmission system. Repeaters 50a and 50b (referred to as repeaters 50 generally) are connected by optical fiber transmission lines L1 and L2. The repeaters 50 include an optical amplifier, a supervisory control part, and a coupler.

The repeater 50a includes a supervisory control part 52a, and has, as to the up transmission line L1, a coupler C13a, a coupler C14a, an optical amplifier 51a, and couplers C11a and C12a.

As to the down transmission line L2, the repeater 50a includes a coupler C15a, a coupler C16a, an optical amplifier 53a, and couplers C17a and C18a.

Similarly, the repeater 50b includes a supervisory control part 52b, and has, as to the up transmission line L1, a coupler C13b, a coupler C14b, an optical amplifier 51b, and couplers C11b and C12b.

As to the down transmission line L2, the repeater 50b includes a coupler C15b, a coupler C16b, an optical amplifier 53b, and couplers C17b and C18b.

The repeater 50a outputs, to the optical fiber transmission line L1, a multiplexed light signal in which the optical main signal and the OSC signal Aosc ($\lambda 1$) are multiplexed. The repeater 50a outputs, to the transmission line L2, the aforementioned OSC signal Aosc serving as the optical supervisory signal in the opposite direction to that of the multiplexed light signal sent by the repeater 50b.

The repeater 50b outputs, to the optical fiber transmission line L2, a multiplexed light signal in which the optical main signal and the OSC signal Bosc ($\lambda 2$) are multiplexed. The repeater 50b outputs, to the transmission line L1, the aforementioned OSC signal Bosc serving as an optical supervisory signal in the opposite direction to that of the multiplexed light signal sent by the repeater 50a. That is, the OSC signals are sent in the up and down direction.

A normal operation is described in which only the operation involved in the up transmission line L1 is described because the operation involved in the down line L2 is the same as that in the up direction.

In step S51, the main signal after passing through the couplers C13a and C14a and being amplified by the optical amplifier 51a is combined, by the coupler C11a, with the OSC signal Aosc $\lambda 1$ which is a light control signal from the supervisory control part 52a. The above combining results in a multiplexed light signal, which passes through the coupler C12a and is sent to the repeater 50b via the optical fiber transmission line L1. The multiplexed light signal thus sent is separated by the coupler C14b into parts, which are respectively sent to the optical amplifier 51b and the supervisory control part 52b.

In step S52, the supervisory control part 52b outputs the optical supervisory signal Bosc ($\lambda 2$). This signal Bosc is combined with the main signal by the coupler C13b, and is sent to the repeater 50a via the optical fiber transmission line L1.

In step S53, the optical supervisory signal Bosc ($\lambda 2$) is separated by the coupler C12a into parts and is input to the supervisory control part 52a.

In step S54, the supervisory control part 52a detects the supervisory signal Bosc ($\lambda 2$), and recognizes the normal receipt.

Figure 10:
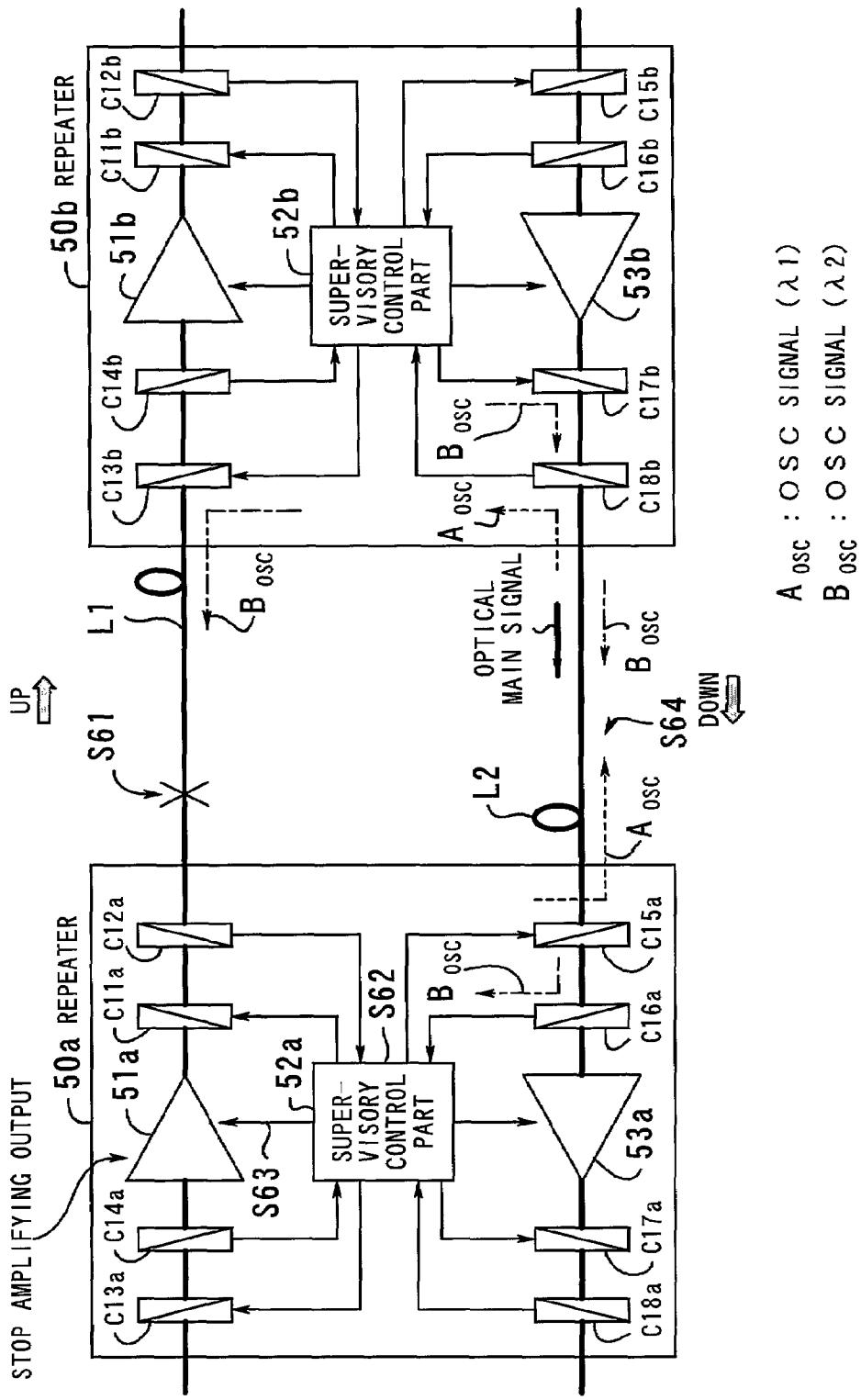
FIG. 10 is a diagram of an operation of the light cutoff control that is performed when an optical fiber transmission line is broken.

Next, a description will be given of an operation of the light cutoff control that is performed when a fault occurs. FIG. 10 shows an operation of the light cutoff control performed when an optical fiber transmission line L1 is disconnected.

In step S61, the optical fiber transmission line L1 is disconnected.

In step S62, since the optical supervisory signal Bosc ($\lambda 2$) does not reach the repeater 50a, the supervisory control part 52a fails to detect it and determines that the optical fiber transmission line L1 has been disconnected.

In step S63, the supervisory control part 52a stops the optical amplifier 51a outputting the signal.

In step S64, the OSC signal Aosc ($\lambda 2$) from the repeater 50a and the OSC signal Bosc ($\lambda 2$) from the repeater 50b are alternately sent and received on the optical fiber transmission line L2. Even if a disconnection occurs in one of the two directions, bidirectional DCC communication can take place.

As described above, by using the OSC signals as the optical supervisory signals in such a way as to be sent in the opposite directions to those of the main signals, DCC mapped in the OSC signals between the repeaters can take place even if one of the two optical fiber transmission lines is disconnected.

Figure 11:
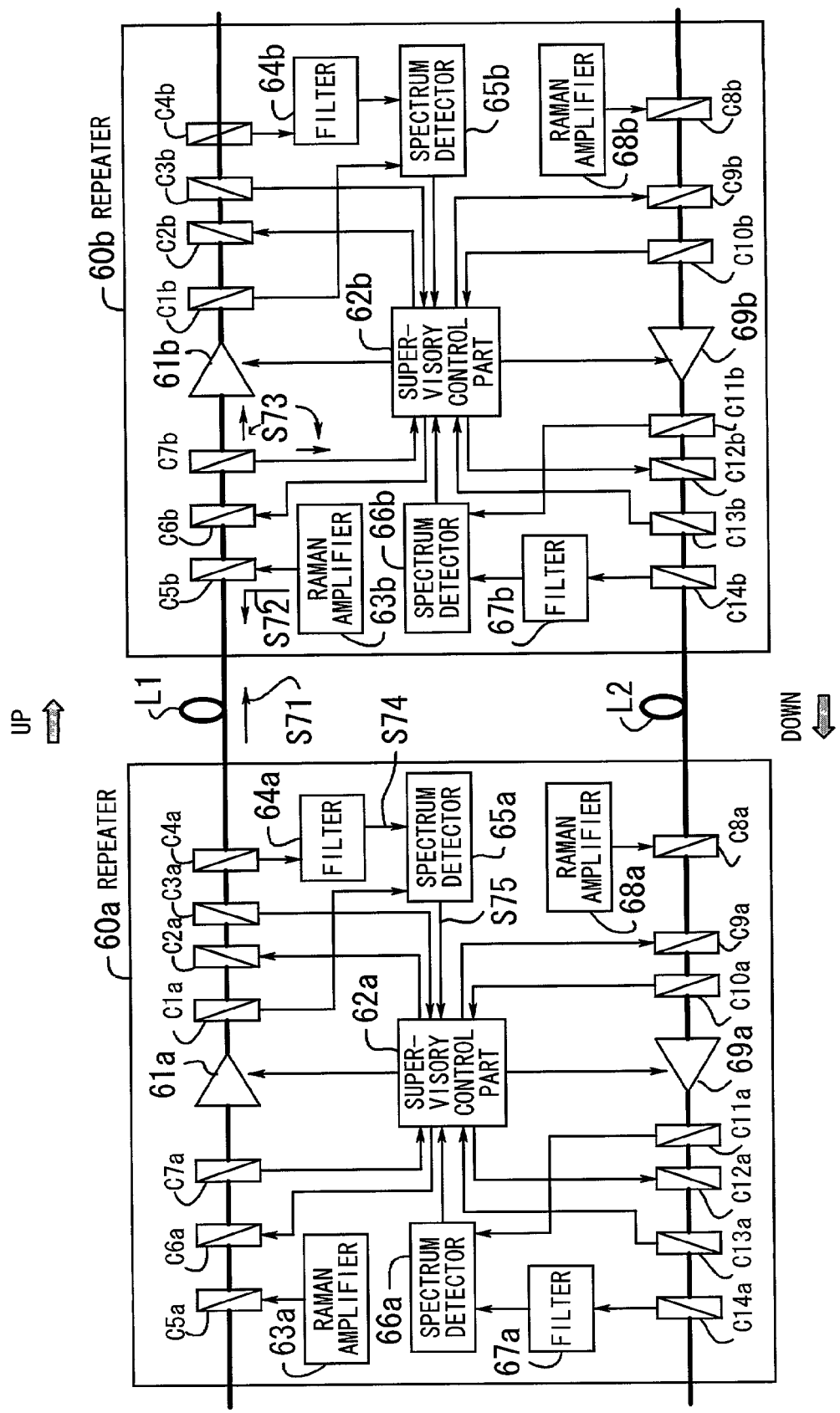
FIG. 11 is a diagram of a structure of a transmission system.

A description will now be given of a repeater with the Raman amplifying function wherein the aforementioned embodiments of the present invention are combined. FIG. 11 shows a corresponding structure of the transmission system.

Repeaters 60a and 60b (referred to as repeaters 60 generally) are connected by the optical fiber transmission lines L1 and L2. The repeaters 60 include an optical amplifier, a supervisory control part, a spectrum detector, an optical filter, a Raman amplifier, and a coupler.

The repeater 60a includes a supervisory control part 62a, and has, to the up transmission line L1, couplers C5a, C6a and C7a, an optical amplifier 61a, couplers C1a, C2a, C3a and C4a, a Raman amplifier 63a, a filter 64a, and a spectrum detector 65a.

As to the down transmission line L2, the repeater 60a includes coupler C8a, C9a and C10a, an optical amplifier 69a, couplers C11a, C12a, C13a and C14a, a Raman amplifier 68a, a filter 67a, and a spectrum detector 66a.

Similarly, the repeater 60b includes a supervisory control part 62b, and has, as to the up transmission line L1, couplers C5b, C6b and C7b, an optical amplifier 61b, couplers C1b, C2b, C3b and C4b, a Raman amplifier 63b, a filter 64b and a spectrum detector 65b.

As to the down transmission line L2, the repeater 60b includes couplers C8b, C9b and C10b, an optical amplifier 69b, couplers C11b, C12b, C13b and C14b, a Raman amplifier 68b, a filter 67b and a spectrum detector 66b.

By using the structure shown in FIG. 11, the system performs the light cutoff control by detection of the Raman pump light when Raman amplification is being performed, and performs the light cutoff control by detection of the optical supervisory signal shown in FIGS. 7 through 10 and output by the supervisory control parts if the Raman amplifier becomes faulty or Raman amplification is not needed.

An operation in normal working is described in which only the operation involved in the up transmission line L1 is described because the operation involved in the down line L2 is the same as that in the up direction.

In step S71, a main signal after passing through the couplers C5a, C6a and C7a and being amplified by the optical amplifier 61a is combined, by the coupler C2a, with the OSC signal which is a light control signal from the supervisory control part 62a. The above combining results in a multiplexed light signal, which passes through the couplers C3a and C4a and is sent to the repeater 60b via the transmission line L1.

In step S72, the multiplexed light signal is optically amplified so that the optical fiber transmission line L1 acts as an amplifying medium that uses a backward Raman scattering light applied to the optical fiber applied to the optical fiber from the Raman amplifier 63b via the coupler C5b.

In step S73, the multiplexed light signal after passing through the couplers C5b and C6b is separated into the optical main signal and the OSC signal by the coupler C7b.

The main signal is inputted to the optical amplifier 61b and OSC signal is inputted to the supervisory control parts 62b.

In step S74, the Raman pump light (the remaining light) is picked up by the coupler C4a, and is filtered by the filter 64a. Then, the filtered Raman pump light is output to the spectrum detector 65a.

In step S75, the spectrum detector 65a detects the spectrum of the pump light received from the filter 64a, and sends the detection result to the supervisory control part 62a. Then, the supervisory control part 62a recognizes the spectrum detected as the normal operating spectrum.

Figure 12:
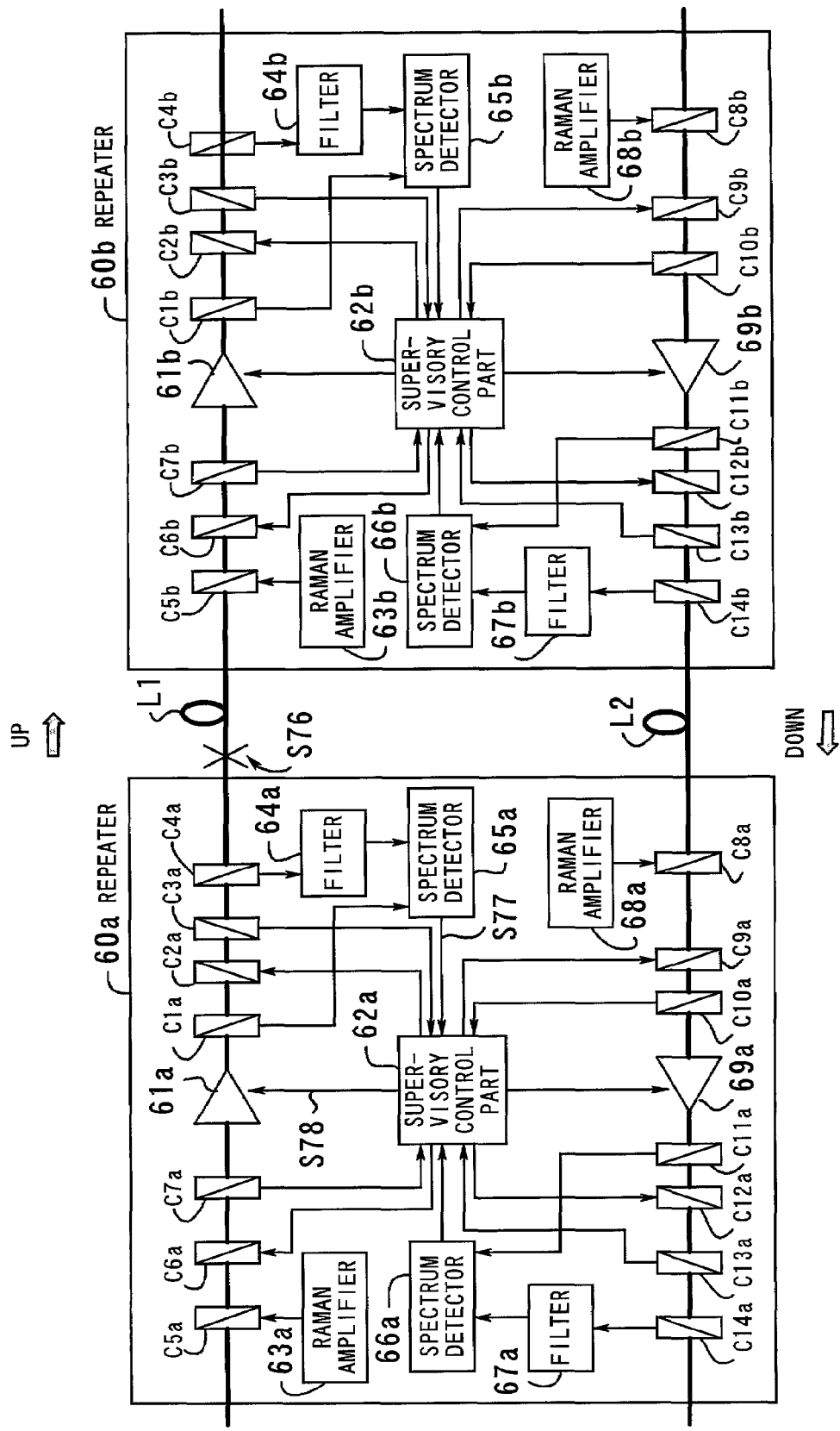
FIG. 12 is a diagram of an operation of the light cutoff control when an optical fiber transmission line is broken.

Next, a description will be given of the light cutoff control that is performed when a fault occurs. FIG. 12 shows an operation of the light cutoff control performed when the optical fiber transmission line L1 is disconnected.

In step S76, a fault occurs in the optical fiber transmission line L1 so that it is disconnected.

In step S77, the Raman pump light does not reach the repeater 60a. Thus, the spectrum detector 65a does not detect the spectrum of the Raman pump light, and sends the detection result to the supervisory control part 62a.

In step S78, the supervisory control part 62a determines, from the result information from the spectrum detector 65a, that the optical fiber transmission line L1 has been disconnected, and stops the optical amplifier 61a outputting the signal.

Figure 13:
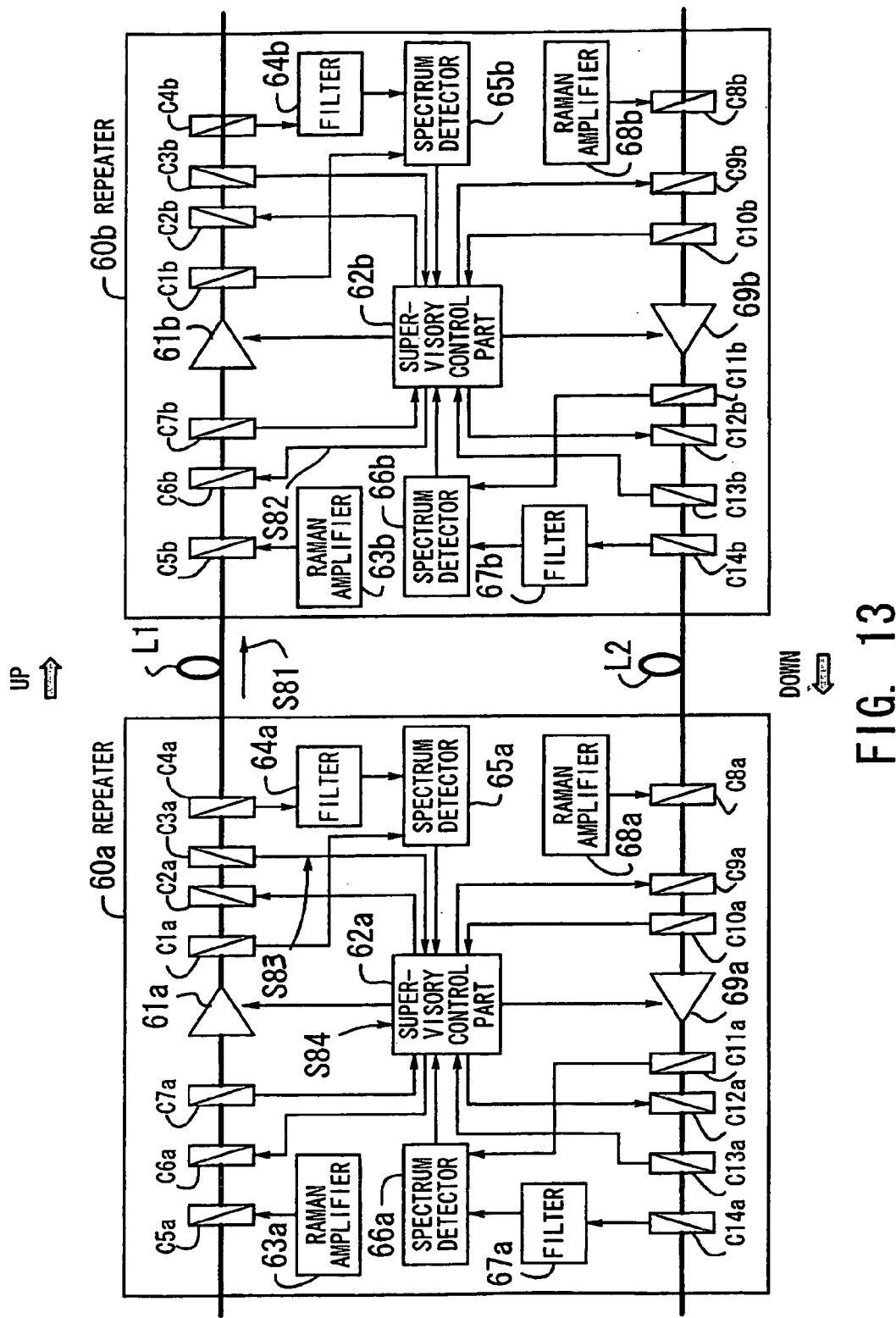
FIG. 13 is a diagram of a structure of an optical system.

A normal operation is described in which only the operation involved in the up transmission line L1 is described because the operation involved in the down line L2 is the same as that in the up direction. The pilot tone signal is used as the optical supervisory signal. FIG. 13 shows a corresponding structure of the transmission system (which is the same as that shown in FIG. 11).

In step S81, the main signal after passing through the couplers C5a, C6a and C7a, being amplified by the optical amplifier 61a and passing through the coupler C1a is combined, by the coupler C2a, with the OSC signal (its wavelength is λ1) which is a light control signal from the supervisory control part 62a. The above combining results in a multiplexed light signal, which passes through the couplers C3a and C4a and is sent to the repeater 60b via the transmission line L1.

In Step S82, the supervisory control part 62b outputs the pilot tone signal (its wavelength is λ2). The pilot tone signal is combined by the coupler C6b and passes through the coupler C5b. Then, the pilot tone signal is sent to the repeater 60a via the optical fiber transmission line L1.

In step S83, the pilot tone signal after passing through the coupler C4a is picked up by the coupler C3a, and is input to the supervisory control part 62a.

In step S84, the supervisory control part 62a detects the pilot tone signal and recognizes normal receiving.

Figure 14:
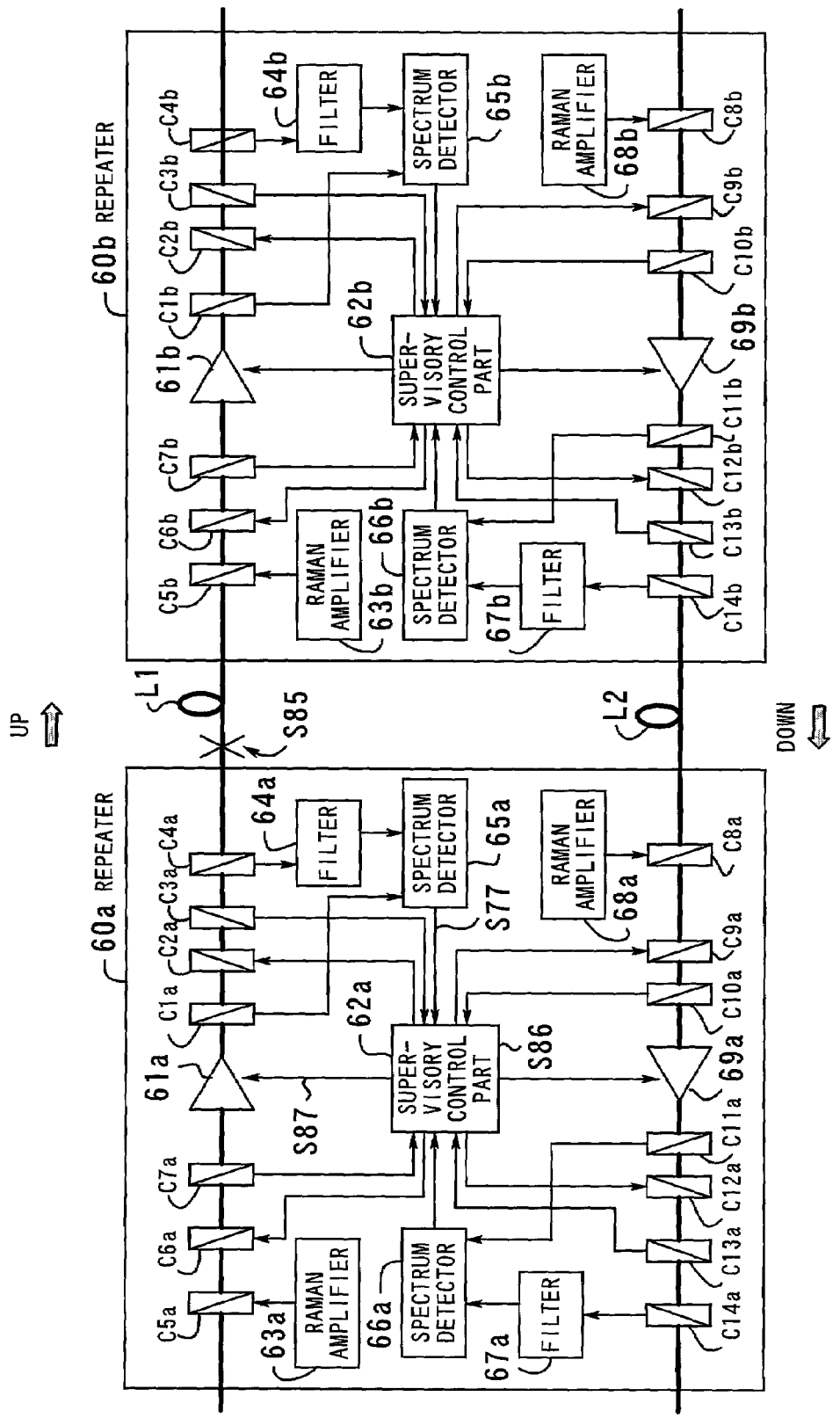
FIG. 14 is a diagram of the light cutoff control when an optical fiber transmission line is broken.
Figure 15:
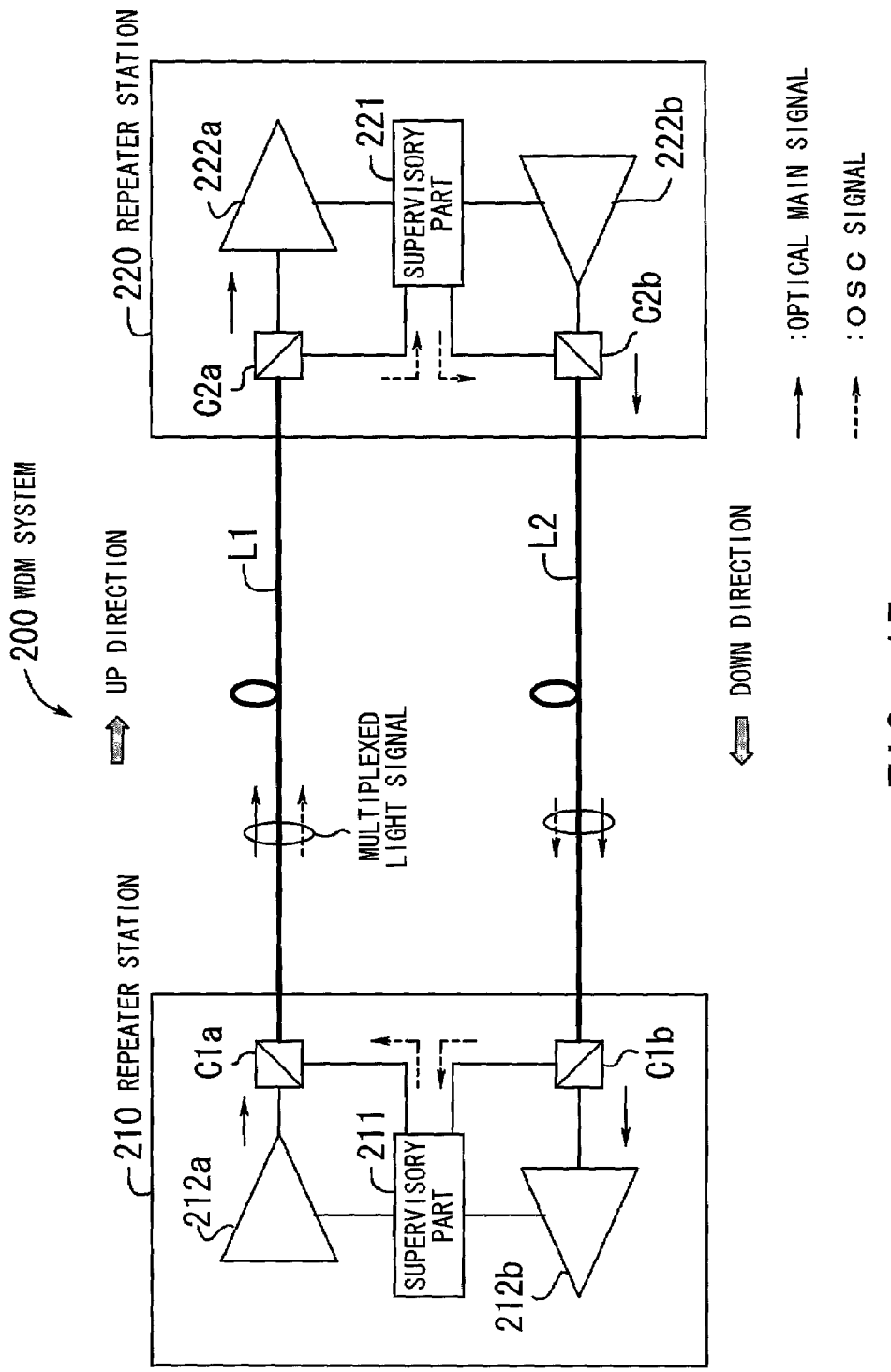
FIG. 15 is a diagram of an outlined structure of a repeater station in a conventional WDM system.
Figure 16:
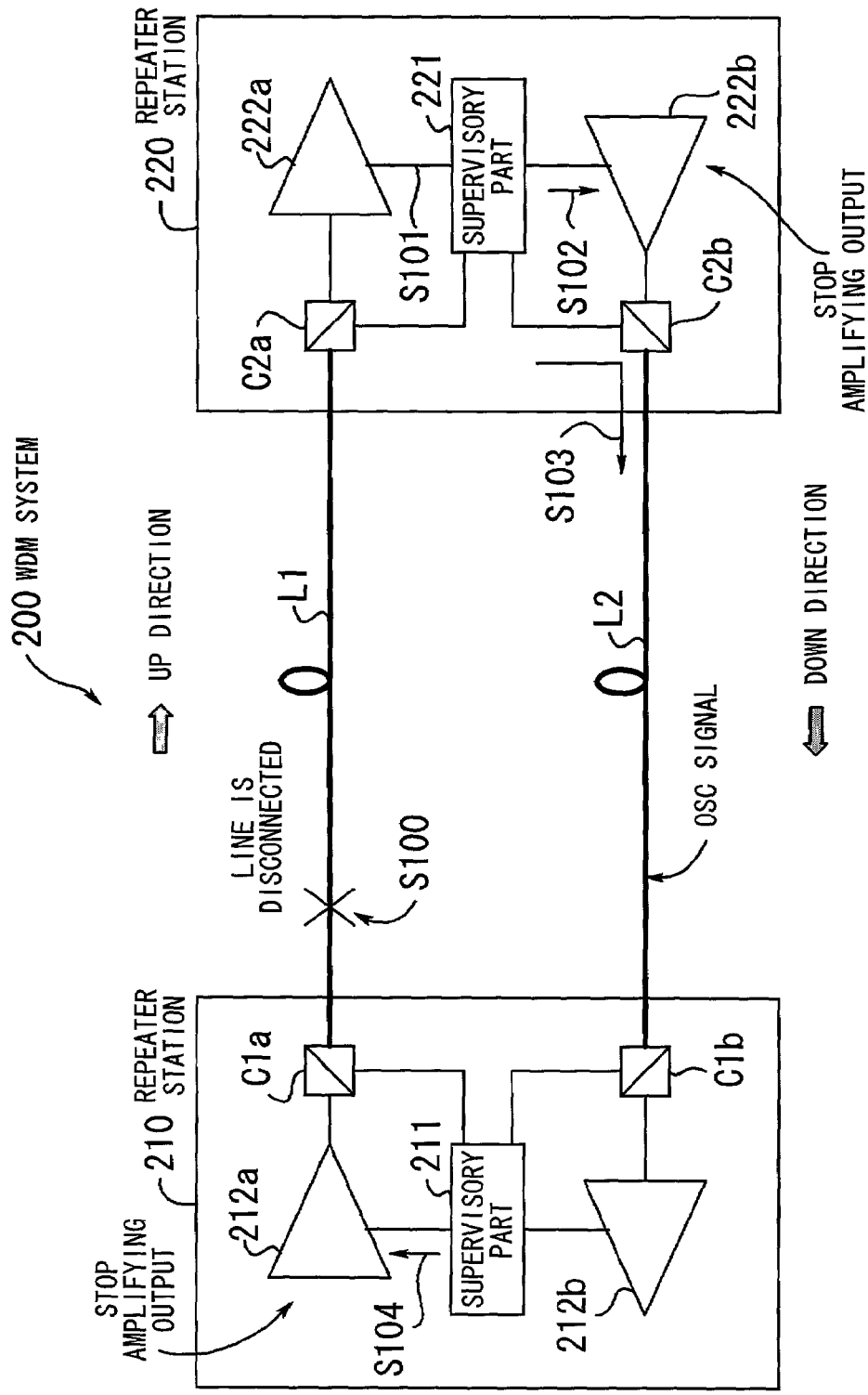
FIG. 16 is a diagram of an operation of a conventional light cutoff control.

Next, a description will be given of an operation of the light cutoff control that is performed when a fault occurs. FIG. 14 shows an operation of the light cutoff control performed when an optical fiber transmission line L1 is disconnected.

In step S85, the optical fiber transmission line L1 is disconnected.

In step S86, since the pilot tone signal does not reach the repeater 60a, the supervisory control part 62a fails to detect it and determines that the optical fiber transmission line L1 has been disconnected.

In step S87, the supervisory control part 62a stops the optical amplifier 61a outputting the signal.

As described above, according to the transmission system and the repeater of the present invention, the light cutoff control that is the measure for safety can be performed in only one of the two directions having the respective lines that may have different amounts of traffic. Thus, the channels can be used efficiently at the time of fault.

As described above, the transmission system according to the present invention detects the pump light sent by the repeater on the receiving side via the optical fiber transmission line over which the optical main signal from the repeater on the sending side travels. Thus, it is possible to efficiently recognize the occurrence of fault and improve the workability and the quality of service.

Also, the repeater of the present invention recognizes occurrence of fault by detecting the pump light sent from the other side via the optical fiber transmission line in which the optical main signal propagates. Thus, it is possible to efficiently recognize the occurrence of fault and improve the workability and the quality of service.

The foregoing is considered as illustrative only of the principles of the present invention. Further, since numerous modifications and changes will readily occur to those skilled in the art, it is not desired to limit the invention to the extract construction and applications shown and described, and accordingly, all suitable modifications and equivalents may be regarded as falling within the scope of the invention in the appended claims and their equivalents.

What is claimed is:

1. A transmission system performing optical transmission, comprising:
   a first repeater and a second repeater,
   wherein the first repeater includes a first light source, a first modulation control part, a first splitter, a first optical amplifier amplifying a first optical main signal, a first Raman amplifier and a first fault occurrence recognizing part,
   wherein the second repeater includes a second light source, a second modulation control part, a second splitter, a second optical amplifier amplifying a second optical main signal, a second Raman amplifier and a second fault occurrence recognizing part,
   wherein the first and second repeaters are optically connected by a first optical transmission line transmitting the first optical main signal and a first optical supervisory channel signal from the first repeater to the second repeater, the first optical supervisory channel signal being produced by modulating a first light signal of a wavelength emitted from the first light source,
   wherein the first and second repeaters are optically connected by a second optical transmission line transmitting a second optical main signal and a second optical supervisory channel signal from the second repeater to the first repeater, the second optical supervisory channel signal being produced by modulating a second light signal of a wavelength emitted from the second light source,
   wherein the first Raman amplifier emits a first Raman pump light into the second optical transmission line in the opposite direction to that of the second optical main signal and the second optical supervisory channel signal, so that the second optical main signal and the second optical supervisory channel signal are amplified, wherein the second Raman amplifier emits a second Raman pump light into the first optical transmission line in the opposite direction to that of the first optical main signal and the first optical supervisory channel signal, so that the first optical main signal and the first optical supervisory channel signal are amplified, wherein the first light signal is separated into a first optical supervisory signal by the first splitter which is provided between the first light source and the first modulation control part, wherein the second light signal is separated into a second optical supervisory signal by the second splitter which is provided between a second light source and the second modulation control part, wherein the first repeater transmits the first optical supervisory signal to the second repeater along the second optical transmission line, wherein the second repeater transmits the second optical supervisory signal to the first repeater along the first optical transmission line, wherein, when the first fault occurrence recognizing part recognizes a level of the second Raman pump light below a predetermined threshold level of the second Raman pump light, the first fault occurrence recognizing part prevents only the first amplifier from amplifying the first optical main signal, wherein, if the second Raman amplifier becomes faulty, and the first fault occurrence recognizing part recognizes a level of the second optical supervisory signal below a predetermined threshold level of the second optical supervisory signal, the fault occurrence recognizing part prevents only the first amplifier from amplifying the first optical main signal, wherein, when the second fault occurrence recognizing part recognize a level of the first Raman pump light below a predetermined threshold level of the first Raman pump light, the second fault occurrence recognizing part prevents only the second amplifier from amplifying the second optical main signal, and wherein, if the first Raman amplifier becomes faulty, and the second fault occurrence recognizing part recognizes a level of the first optical supervisory signal below a predetermined threshold level of the first optical supervisory signal, the second fault occurrence recognizing part prevents only the second amplifier from amplifying the second optical main signal.

2. A transmission system performing optical transmission, comprising:

a first repeater and a second repeater, wherein the first and second repeaters are optically connected by a first optical transmission line transmitting a first optical main signal and a first optical supervisory channel signal from the first repeater to the second repeater, and a second optical transmission line transmitting a second optical main signal and a second optical supervisory channel signal from the second repeater to the first repeater, wherein the second repeater transmits the second optical supervisory channel signal serving as a second optical supervisory signal to the first repeater along the first optical transmission line, wherein the first repeater transmits the first optical supervisory channel signal serving as a first optical supervisory signal to the second repeater along the second optical transmission line, wherein the first repeater includes a first optical amplifier amplifying the first optical main signal, a first Raman amplifier and a first fault occurrence recognizing part, wherein the second repeater includes a second optical amplifier amplifying the second optical main signal, a second Raman amplifier and a second fault occurrence recognizing part, wherein the first Raman amplifier emits a first Raman pump light into the second optical transmission line in the opposite direction to that of the second optical main signal and the second optical supervisory channel signal, so that the second optical main signal and the second optical supervisory channel signal are amplified, wherein the second Raman amplifier emits a second Raman pump light into the first optical transmission line in the opposite direction to that of the first optical main signal and the first optical supervisory channel signal, so that the first optical main signal and the first optical supervisory channel signal are amplified, wherein, when the first fault occurrence recognizing part recognizes a level of the second Raman pump light below a predetermined threshold level of the second Raman pump light, the first fault occurrence recognizing Part prevents only the first amplifier from amplifying the first optical main signal, wherein, if the second Raman amplifier becomes faulty, and first fault occurrence recognizing part recognizes a level of the second optical supervisory signal below a predetermined threshold level of the second optical supervisory signal, the fault occurrence recognizing part prevents only the first amplifier from amplifying the first optical main signal, wherein, when the second fault occurrence recognizing part recognizes a level of the first Raman pump light below a predetermined threshold level of the first Raman pump light, the second fault occurrence recognizing part prevents only the second amplifier from amplifying the second optical main signal, and wherein, if the first Raman amplifier becomes faulty, and the second fault occurrence recognizing part recognizes a level of the first optical supervisory signal below a predetermined threshold level of the first optical supervisory signal, the second fault occurrence recognizing part prevents only the second amplifier from amplifying the second optical main signal.

* * * * *

UNITED STATES PATENT AND TRADEMARK OFFICE
CERTIFICATE OF CORRECTION

| | | |
|---|---|---|
| PATENT NO. | : 7,174,108 B2 | Page 1 of 1 |
| APPLICATION NO. | : 10/099965 | |
| DATED | : February 6, 2007 | |
| INVENTOR(S) | : Yuji Kamura | |

It is certified that error appears in the above-identified patent and that said Letters Patent is hereby corrected as shown below:

Column 14, line 33, change "Part" to --part--; and line 36, after "and" insert --the--.

Signed and Sealed this

Eighth Day of May, 2007

JON W. DUDAS
*Director of the United States Patent and Trademark Office*